Patented Feb. 28, 1933

1,899,590

UNITED STATES PATENT OFFICE

WILLIAM K. SCHWEITZER, OF EAST CLEVELAND, OHIO, ASSIGNOR TO THE GRASSELLI CHEMICAL COMPANY, OF CLEVELAND, OHIO, A CORPORATION OF DELAWARE

METHOD OF CURING CONCRETE

No Drawing.  Application filed November 17, 1930.  Serial No. 496,357.

The present invention relates to a method of curing concrete in which a sodium silicate solution containing an ammonium salt is applied to the surface of the freshly laid, or green concrete.

Sodium silicate solutions are frequently spread upon concrete surfaces during curing. The silicate is believed to form a seal of the pores of the surface of the concrete and thereby minimize the evaporation of the water contained in the concrete mix, which water is required for the setting of the concrete. The seal is assumed to be formed by a slow evaporation of the water contained in the silicate solution with possible formation of free silicic acid.

The addition of salts in substantial amounts to sodium silicate solutions produces a gelling of the silicate with separation, or precipitation of silicic acid. Small amounts of salts do not precipitate silicic acid and such small amounts are tolerated by the sodium silicate. The amounts so tolerated depend upon the composition, concentration and temperature of the silicate solution, as well as upon the nature of the salt.

In the case of ammonium salts the gelling, or precipitating action, is somewhat different from that obtained with other salts. The precipitating action of ammonium salts is counteracted to a certain extent by the peptizing action of the free ammonia formed in the strongly alkaline silicate solution, and the precipitating effect becomes effective only when this free ammonia is expelled as by higher temperature or on drying out of this solution; though large amounts of ammonium salts will also immediately precipitate silicic acid.

I have found that sodium silicate solutions containing small amounts of ammonium salts will when spread upon freshly laid concrete coagulate, set or otherwise solidify and thereby seal the pores of the concrete on its surface, and my invention comprises applying sodium silicate solutions containing small amounts of an ammonium salt to the surfaces of green concrete during curing.

The setting on exposure to air of sodium silicate solutions containing small amounts of an ammonium salt is quicker than the setting of straight sodium silicate solutions, and a more homogeneous and apparently less pervious film is obtained from a solution containing an ammonium salt. The application of the sodium silicate solutions according to my invention to concrete surfaces during curing results in a better protection of the concrete with less evaporation of water and better all around properties of the resulting concrete.

The amounts of ammonium salts which are tolerated by sodium silicate solutions depend, to a certain extent, upon the concentration and composition of the silicate. Sodium silicate solutions of a density of 33–36° Bé. and of a composition of 1 $Na_2O$ to about 3.2 $SiO_2$, which are commonly used for protecting concrete surfaces during curing will tolerate up to about 2% of an ammonium salt, that is to say solutions of the above composition containing such amounts will not precipitate or settle out silicic acid under ordinary conditions. When spread out as a liquid film such solutions will, however, form a solid film, in from one-third to two-thirds of the time in which straight sodium silicate solutions will dry out, and the film produced is less pervious.

Ammonium acetate, ammonium sulfate, ammonium chloride and ammonium nitrate are some of the ammonium salts I have added to sodium silicate solutions in non-precipitating amounts, and I have applied the so modified solutions for protecting purposes to freshly laid concrete. I found that the properties of the resulting concrete when tested by the well known laboratory methods were in all instances superior to concrete protected during curing with straight sodium silicate solutions and that they compared very favorably with concretes protected during curing by other well known means.

I have found that among the various ammonium salts which I have added to sodium silicate solutions, ammonium chloride improved to a remarkable degree the protection afforded by the silicate to concrete during its curing period and this salt appears to be the most practical addition agent to be used.

The incorporation of ammonium salts in non-precipitating amounts, as for instance, 2% of the weight of a 33° Bé. solution, into sodium silicate solutions, presents no difficulty whatsoever.

The application of such modified solutions for protection of green concrete follows in general the methods used with a straight sodium silicate. The freshly laid concrete surface is, for instance, covered during the first 24 hours with wet burlap. A 33 to 36° Bé. solution containing a non-precipitating amount of an ammonium salt is then flushed upon the surface and uniformly distributed thereon with a broom. The modified sodium silicate will soon seal the pores of the surface, which is then ready for use after the proper curing period. Excellent results can also be obtained with my silicate containing ammonium salts when applying it at lower concentrations, such as at 25, 20 or even a lower degree Bé., though with such solutions more than one application may be required.

I claim:

1. The method of protecting concrete surfaces during curing which comprises applying to the surface of the uncured concrete a sodium silicate solution containing a non-precipitating amount of an ammonium salt.

2. The method of protecting concrete surfaces during curing which comprises applying to the surface of the uncured concrete a sodium silicate solution containing a non-precipitating amount of ammonium chloride.

In testimony whereof, I affix my signature.

WILLIAM K. SCHWEITZER.